(12) United States Patent
Fonseca et al.

(10) Patent No.: US 9,094,316 B2
(45) Date of Patent: Jul. 28, 2015

(54) DYNAMIC NAME GENERATION

(75) Inventors: Francisco Jose Rojas Fonseca, San Jose (CR); Jorge Arturo Sauma Vargas, San Jose (CR)

(73) Assignee: Hewlett-Packard Development Company, L.P., Houston, TX (US)

( * ) Notice: Subject to any disclaimer, the term of this patent is extended or adjusted under 35 U.S.C. 154(b) by 358 days.

(21) Appl. No.: 13/015,896

(22) Filed: Jan. 28, 2011

(65) Prior Publication Data
US 2012/0195231 A1 Aug. 2, 2012

(51) Int. Cl.
H04L 12/28 (2006.01)
H04L 12/24 (2006.01)
H04L 29/12 (2006.01)

(52) U.S. Cl.
CPC ............. H04L 41/12 (2013.01); H04L 61/303 (2013.01); H04L 61/609 (2013.01)

(58) Field of Classification Search
USPC ............. 370/254–258, 392, 393, 399, 395.3, 370/395.31, 395.54, 408, 409, 474, 475
See application file for complete search history.

(56) References Cited

U.S. PATENT DOCUMENTS

| | | | |
|---|---|---|---|
| 5,555,401 A | 9/1996 | Allen et al. | |
| 6,754,321 B1 * | 6/2004 | Innes et al. | 379/201.03 |
| 7,730,173 B2 * | 6/2010 | Simpson | 709/224 |
| 2004/0205235 A1 * | 10/2004 | Matsuhira | 709/238 |
| 2008/0310323 A1 * | 12/2008 | Shirota et al. | 370/254 |
| 2009/0144430 A1 | 6/2009 | Thambrahalli et al. | |
| 2009/0154359 A1 * | 6/2009 | Strutt et al. | 370/238 |
| 2009/0222541 A1 | 9/2009 | Monga et al. | |

FOREIGN PATENT DOCUMENTS

| | | |
|---|---|---|
| CN | 101193129 A | 6/2008 |
| JP | 2001216240 A | 8/2010 |

* cited by examiner

*Primary Examiner* — Alvin Zhu
(74) *Attorney, Agent, or Firm* — Hewlett-Packard Patent Department

(57) ABSTRACT

A dynamic name of a device within a network may be generated by accessing information related to the device; accessing information related to a remote, neighbor device; generating a dynamic name of the device based on the accessed information related to the device and the accessed information related to the remote, neighbor device; and storing the generated dynamic name of the device. Alternatively, a topology map of devices within a network may be generated where a central controller may access, from memory, a dynamic name of controlled devices, the dynamic name of the controlled devices including information related to remote, neighbor devices of the controlled devices. The topology map may include dynamic names of the controlled devices.

15 Claims, 6 Drawing Sheets

DYNAMIC NAME GENERATION

BACKGROUND OF THE INVENTION

A network may include a large number of devices. From time to time, administrators may need to ascertain information regarding the specific devices within the network.

Devices may have stored thereon a name that may be configured by the manufacturer. The name may include limited information such as a serial number of the device. Thus, when an administrator tries to access information regarding the device, the name does not provide meaningful information to the administrator regarding where the device may be located within the network.

DRAWINGS

DETAILED DESCRIPTION

In a network that includes a large number of devices, an administrator may want to conveniently ascertain information about each device, for example, a physical location, a relative location, etc. In, addition, if a device is moved from one location to another location, an administrator may want to update information about the device, for example, the physical location, the relative location, etc., without having to update the information by accessing the device and manually changing the name of the device.

As discussed herein, a dynamic name may be generated for a device. A dynamic name definition may be configured by an administrator. When a device comes on-line in a network, using information extracted from a communication from a neighbor device, a dynamic name of the device may be generated by populating the dynamic name definition with information, for example, related to the device, information related to the neighbor device, etc.

System Environment

Figure 1:
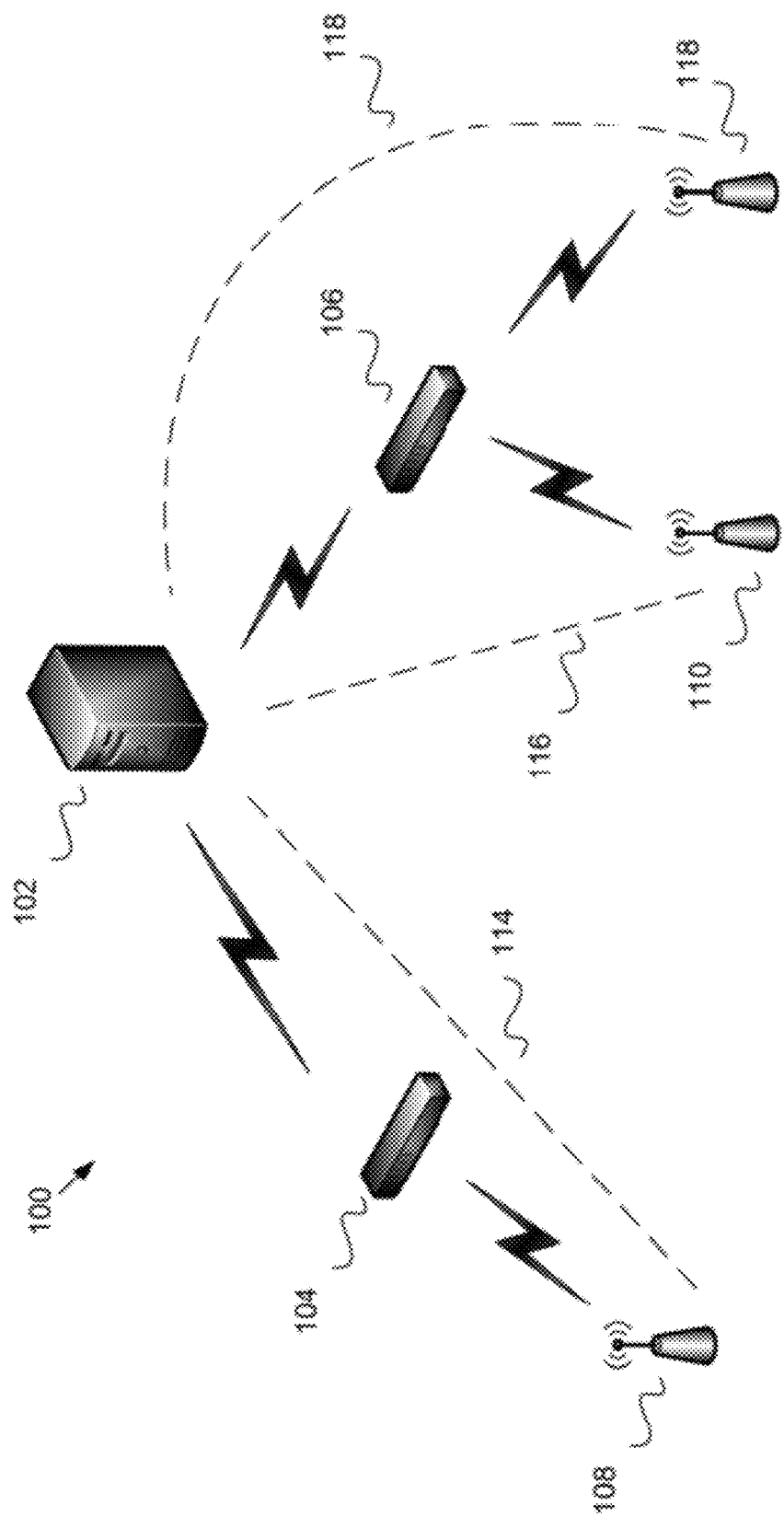
FIG. 1 is a diagram depicting an example of a system environment, according to at least one embodiment of the present disclosure.

FIG. 1 depicts an example of a system environment. It may be appreciated that additional devices may reside within system 100. As shown in FIG. 1, system environment 100 includes central controller 102. Central controller 102 may be communicably linked to all the devices within system 100. Devices within system 100 may include, for example, central controllers, controlled devices, access points, switches, routers, etc. Central controller 102 may be implemented as a computing device, for example, a server computing device. Central controller 102 may enable a user, for example, an administrator, to view, access, maintain, control, etc., information regarding devices within system 100.

System 100 may further include switches 104, 106. Switches 104, 106 may facilitate communication between controlled devices, communication between controlled devices and central controller 102, etc. As switch 104 is a neighbor device of controlled device 108 and central controller 102, switch 104 may further communicate discovery protocol information to controlled device 108 and central controller 102. As switch 106 is a neighbor device of controlled devices 110, 112 and central controller 102, switch 106 may further communicate discovery protocol information to controlled devices 110, 112 and central controller 102.

System 100 may further include controlled devices 108, 110, 112. Controlled devices 108, 110, 112 may receive discovery protocol information from their respective neighbor switch. Controlled device 108 may communicate information related to controlled device 108, for example, a dynamically generated name, or dynamic name, of controlled device 108, directly to central controller 102 via communication 114. Controlled device 110 may communicate information related to controlled device 110, for example, a dynamically generated name, or dynamic name, of controlled device 110, directly to central controller 102 via communication 116. Controlled device 112 may communicate information related to controlled device 112, for example a dynamically generated name, or dynamic name, of controlled device 112, directly to central controller 102 via communication 118.

Central Controller

Figure 2:
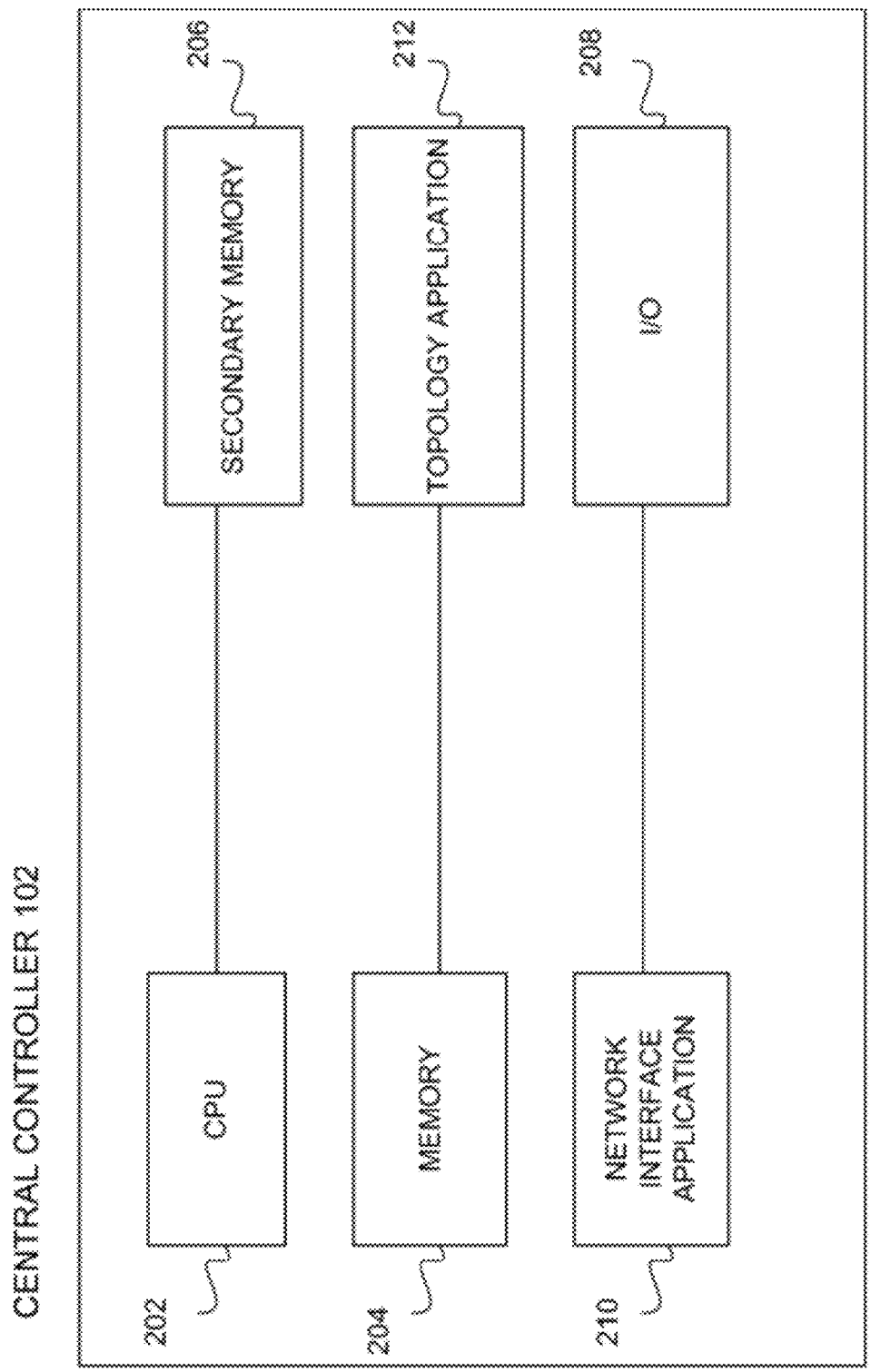
FIG. 2 is a diagram of an example of a device within the system environment, according to at least one embodiment of the present disclosure.

FIG. 2 depicts a block diagram of an example of central controller 102. It may be appreciated that central controller 102 may include additional components that are not depicted in FIG. 2.

As shown in FIG. 2, central controller includes central processing unit 202, memory 204, secondary memory 206, input/output (I/O) 208, network interface application 210, dynamic name application 212, and topology application 214.

Network interface application 210 enables communication between central controller 102 and all of the devices within system 100.

Topology application 212 is an application that generates a topology map including one or more devices within system 100. Topology application 212 may be implemented as, for example, ProCurve Manager software. This topology map may be generated by topology application 212 based on information topology application 212 accesses relating to each of the devices within system 100. This information may be stored in memory 204, secondary memory 206, memory remote to central controller 102, etc. This information relating to each of the devices within system 100 may include the dynamically generated name of the device, the device type, the device model, the device serial number, a physical location of the device, information relating to one or more neighbors of the device, etc.

Controlled Device

Figure 3:
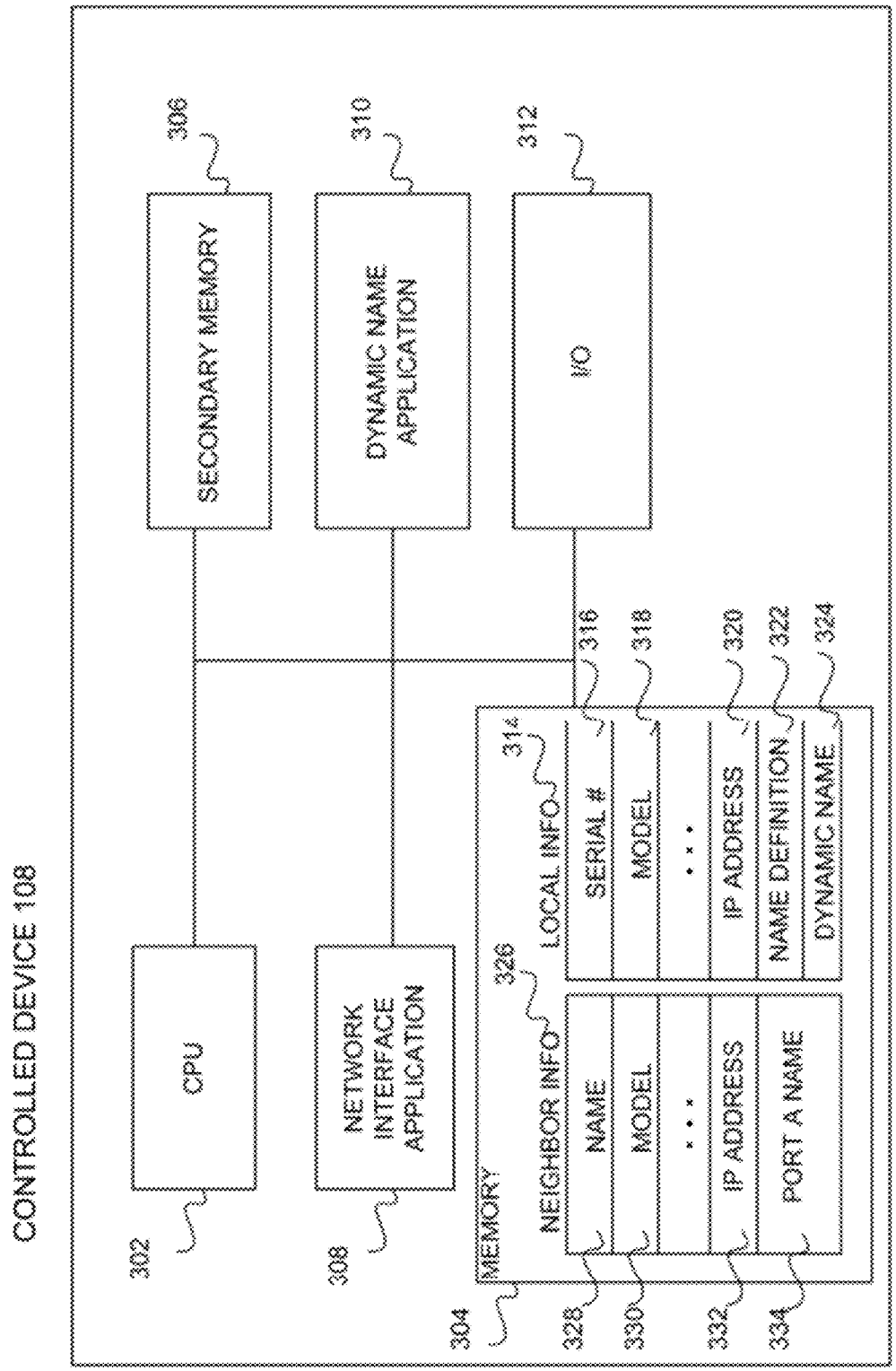
FIG. 3 is a diagram of an example of a central controller, according to at least one embodiment of the present disclosure.

FIG. 3 depicts an example of a controlled device 108. It may be appreciated that controlled device 110 and controlled device 112 may include similar components and function similarly as discussed herein with regard to controlled device 108. As shown in FIG. 1, controlled device 108 includes CPU 302, memory 304, secondary memory 306, network interface application 308, dynamic name application 310, and I/O 312.

1. Memory

Memory 304 may store local information 314 relating to the controlled device 108, itself. For example, controlled device 108 may store its serial number 316, model 318, internet protocol (IP) address 320, dynamic name definition 322, dynamically generated name 324, etc. The dynamic name definition 322 and dynamically generated name 324 are discussed below. In addition, memory 304 may store information related to the controlled device 108's neighbor, which is, in this example, switch 104. For example, neighbor information 326 may include the neighbor device's name 328, model 330, IP address 332, port A name 334 (the port to which communication is facilitated between switch 104 and controlled device 108), etc. This information may be received at controlled device 108 from the neighbor device, which is, in this example, switch 104, during a discovery process discussed below.

2. Network Interface Application

Network interface application 308 enables communication between controlled device 108, switch 104, central controller 102, and with other devices within system 100. One type of communication that may be enabled between controlled device 108 and switch 104 may be through IEEE 802.1AB link layer discovery protocol (LLDP). LLDP defines a standard method for Ethernet network devices, such as switches, routers, wireless LAN access points etc., to advertise information about themselves to other nodes or devices on the network and to store the information they discover. It may be appreciated that other discovery protocols may be implemented, for example, Cisco discovery protocol (CDP), any other layer 2 discovery protocol, any layer 3 discovery protocol, etc. LLDP communications from switch 104 to controlled device 108 may include information relating to switch 104, for example, name of switch 104, model, IP address, port A name (the port to which communication is facilitated between switch 104 and controlled device 108), etc. This information may be parsed from the LLDP communication received at controlled device 108 and may be stored in neighbor information 326, as discussed above. Discovery protocol communications may be sent from, for example, switch 104 in periodic intervals, for example, every thirty seconds. If a device receives a discovery protocol communication from two devices at the same time, the communication from the neighbor device with a higher priority may be parsed for information relating to the neighbor device of the higher priority, and the parsed information may be stored in neighbor information 326.

Network interface application may further enable communication 114 (FIG. 1) between controlled device 108 and central controller 102. Communication 114 may include the dynamic name of controlled device 108.

3. Dynamic Name Application

Dynamic name application 310 enables a user to configure a dynamic name definition through, for example a command line interface (CLI). Dynamic name application may be stored, for example, in flash RAM and may be implemented as part of a firmware of the device. As discussed herein, software and firmware may be implemented as machine readable instructions.

The dynamic name definition as configured by the user may be stored, for example, in dynamic name definition 322. The dynamic name definition may incorporate dynamic components, static components, etc., as defined by a user. Static components may be components that do not change regardless of what devices are the neighbors of the device, where the device is located within system 100, etc. Dynamic components may be components that do change depending on the neighbor of the device, where the device is located within system 100, etc. As such, if a device is physically moved from one location within system 100 to another location within system 100, the static components of the name stay the same while the dynamic components of name may change.

Upon start up of controlled device 108, a user, through the CLI, may configure the dynamic name definition. It may be appreciated that the dynamic name definition may be similarly configured for similar devices within the system. For example, all controlled devices may have the same dynamic name definition. This definition may be configured as the same definition of the dynamic name definition of other devices within system 100. For example, the user may configure the dynamic name definition of controlled device 108 as follows:

Name=Switch <Remote Name><Remote Port>-AP-<Local Serial Number><Local IP Address>

In this example, "Switch" and "AP" are static components and will not change when the dynamic name definition is populated. "Remote Name," "Remote Port," "Local Serial Number" and "Local IP Address" are dynamic components and will change when the dynamic name definition is populated. As switch 104 is a neighbor device to controlled device 108, Remote Name will be populated with the name of the Switch that controlled device 108 is connected to. Remote Port will be populated with the port name that controlled device 108 is connected to. Local Serial Number will be populated with the serial number of controlled device 108 as assigned by, for example, the manufacturer. Local IP Address will be populated with the IP address assigned to controlled device 108. Thus, the dynamic name may be a user-configurable string of characters that may include information related to controlled device 108 and its neighbor device, switch 104. The population and generation of the dynamic name of the controlled device 108 may be performed by dynamic name application 310. It may be appreciated that the CLI enabling the user to define the name may be enabled by dynamic name application 310 or by a different application within controlled device 108.

As an example, a dynamic name of a device may be as follows: Switch SW_Building3_Floor2-Port A14-APJ88323. Thus, as can be seen from this example, the dynamic name identifies that the controlled device 108 is communicably linked to a switch that is located in building 3, floor 2 at port A14. If controlled device is moved to a new location, the switch information populated in the dynamic component of the controlled device's dynamic name may be updated with the new switch information, thereby identifying the new location.

It may be appreciated that any other type of information that is known about the neighbor device or the controlled device may be used in configuring the dynamic name definition.

By providing for a dynamic name that is generated based on information related to the device, for example, the controlled device 108, and its remote, neighbor, for example switch 104, if the controlled device 108 goes down and looses communication with the central controller, an administrator merely needs to look at the dynamic name of the controlled device 108 in order to ascertain its location. Once the location is known, the administrator can take appropriate steps to restart connectivity with controlled device 108.

In addition, when a device is moved from one location to another location and brought on-line, upon receipt of a discovery protocol communication from a new neighbor device, information regarding the new neighbor device may be extracted from the discovery protocol communication, updated in the neighbor information 326, and a new dynamic name of the device may be generated using the new neighbor information. The new dynamic name of the device may then be communicated to central controller 102 where central controller may update the dynamic name of the device.

If the neighbor of the device is moved, when the device receives a discovery protocol communication from the new neighbor device, upon receipt of a discovery protocol communication from a new neighbor device, information regarding the new neighbor device may be extracted from the discovery protocol communication, updated in the neighbor information 326, and a new dynamic name of the device may be generated using the new neighbor information. The new dynamic name of the device may then be communicated to central controller 102 where central controller may update the dynamic name of the device.

As noted above, discovery protocol communications are sent on a periodic basis. If information within the discovery protocol communication changes, a new dynamic name may be generated. For example, if controlled device 108 and switch 104 were communicating through port A at switch 104, and port A goes down, then switch 104 may establish communication to controlled device 108 through port B. In the next discovery protocol communication from switch 104, port B would be identified as the port through which communication is established. Upon receipt of the discovery protocol communication identifying port B, controlled device 108 may compare the information received in the discovery protocol communication with the information that is stored in neighbor information 326. Any different information may be updated in neighbor information 326. If the dynamic components of the dynamic name definition have changed, then a new dynamic name may be generated by controlled device 108 and the new dynamic name may be communicated to central controller 102. Central controller 102 may then update the dynamic name information of controlled device 108.

Thus, upon receipt of a new discovery protocol communication, the communication is parsed to obtain the neighbor device information. The parsed neighbor device information is then compared with the stored neighbor device information. If any of the information that is parsed from the discovery protocol information is different than the information stored in neighbor information 326, the information stored in neighbor information 326 is updated, and a new, updated dynamic name of the device may be generated. The new, updated, dynamic name includes the updated information that was received from the most recent discovery protocol information. The new, updated, dynamic name may then be communicated to the central controller 102.

If a discovery protocol communication is not received at a device from its neighbor, then the device may assume that it is no longer communicably linked to its neighbor. However, the device may maintain its dynamic name until a discovery protocol communication is received from a new neighbor. As such, a user may determine what device is down based on the neighbor information included in the device's dynamic name.

Dynamic Name Generation

Figure 4:
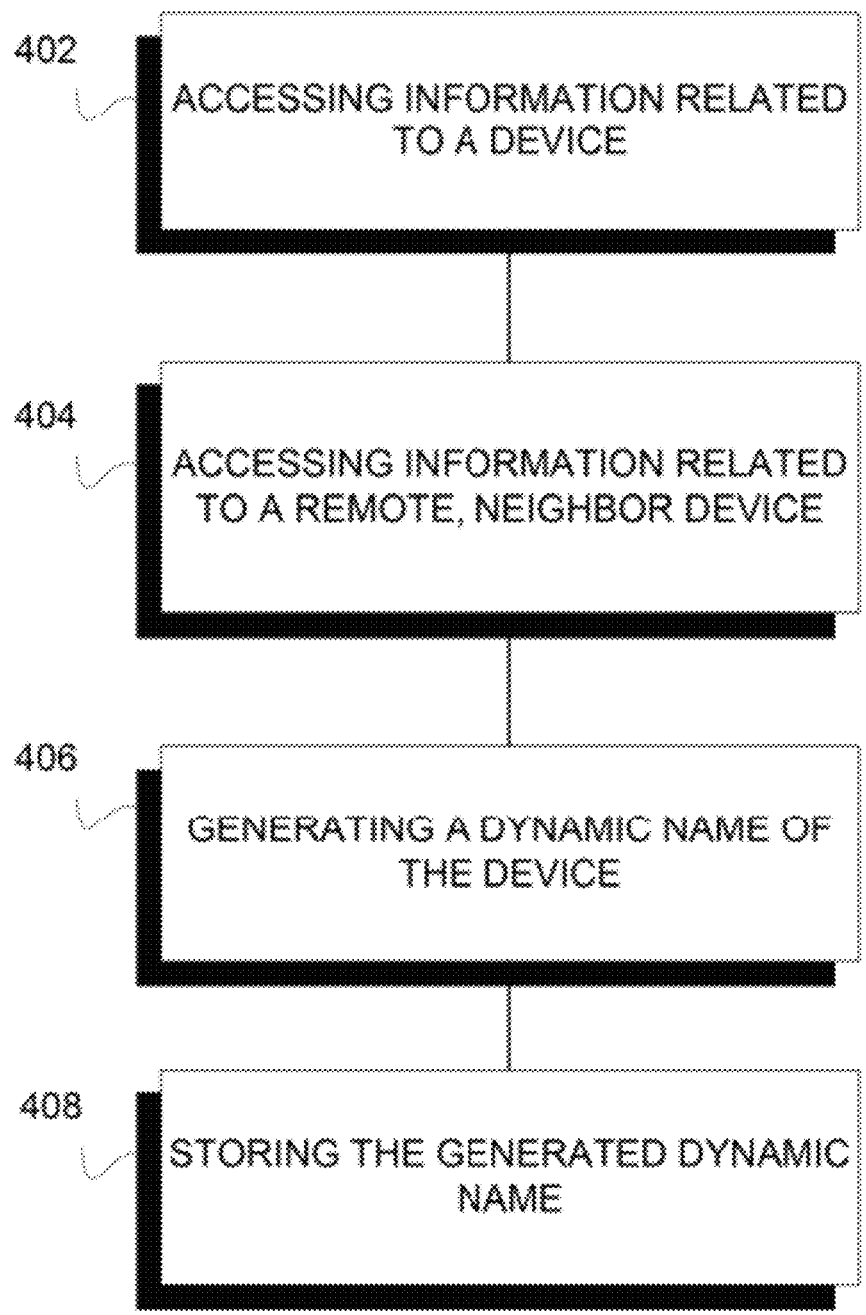
FIG. 4 is a flow diagram of an example of a method for generating a dynamic name according to at least one embodiment of the present disclosure.

FIG. 4 depicts an example of a flow diagram of a method for generating a dynamic name. It may be appreciated that this method may be performed at any device operating within system 100. As shown in FIG. 4, a device within system 100 may access information related to the device (402). This information may be stored in local information 314 stored in memory 304, and may include information that is provided by a manufacture of the device, an IP address assigned to the device, etc. The device may access information related to a remote, neighbor device (404). This information may be stored in neighbor information 326. The stored neighbor information 326 may be obtained by extracting it from a discovery protocol communication sent, for example, using a layer 2 or layer 3 discovery communication protocol, received at the device from the remote, neighbor device.

A dynamic name of the device may be generated based on the accessed information related to the device and the remote, neighbor device (406). The dynamic name may be generated by accessing a dynamic name definition, where the dynamic name definition may have a static component and a dynamic component. The dynamic component of the dynamic name definition may be populated with the accessed information related to the device and the remote, neighbor device.

The generated dynamic name of the device may be stored (408). The generated dynamic name of the device may be stored in local information 314, specifically dynamic name 324. The generated dynamic name may be transmitted to central controller 102.

The device may receive a discovery protocol communication from a different remote, neighbor device. This may be when the remote, neighbor device has been taken offline and a new, or different, remote, neighbor device is online. Upon receipt of the discovery protocol communication, the device extracting information related to the different remote, neighbor device and stores the information related to the different remote device by updating the corresponding information in neighbor information 326. An updated dynamic name of the device may be generated based on the accessed information related to the device and the information related to the different remote, neighbor device. The generated updated dynamic name may be stored in dynamic name 324 and transmitted to central controller 102.

Topology Map Generation

Figure 5:
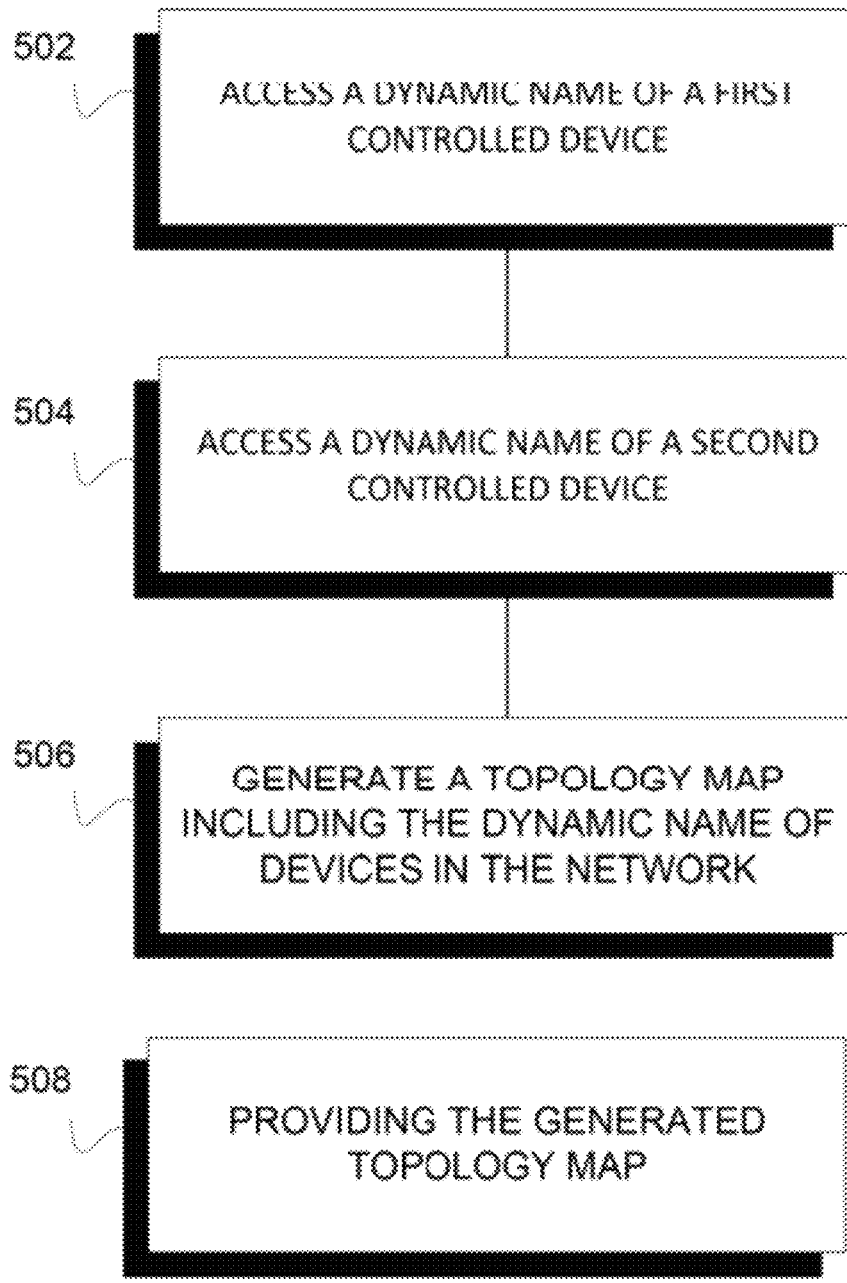
FIG. 5 is a flow diagram of an example of a method for generating a topology map according to at least one embodiment of the present disclosure.

FIG. 5 is a flow diagram of an example of a method performed at central controller 102 for generating a topology map. As shown in FIG. 5, central controller 102 may access, from memory, a dynamic name of a first controlled device. The dynamic name of the first controlled device may include information related to a remote, neighbor device of the first controlled device (502). For example, the first controlled device may be controlled device 108 and remote, neighbor device may be switch 104. The central controller 102 may then access a dynamic name of a second controlled device, the dynamic name of the second controlled device including information related to a remote, neighbor device of the second controlled device (504). For, example, the second controlled device may be controlled device 110 and the remote, neighbor of the second controlled device may be switch 106. Using topology application 212, central controller may generate a topology map of a network including the first controlled device and the second controlled device (506). Central controller 102 may then provide the generated topology map (508) by displaying the generated topology map on a display at central controller 102, transmit the generated topology map to another device within system 100, etc.

Central controller may receive a communication from the first controlled device, controlled device 108. The communication may include, for example, an updated dynamic name of the first controlled device. Upon receipt of the communication, the central controller 102 may update, in memory, the dynamic name of the first controlled device with the updated dynamic name of the first controlled device. The generated topology map may be updated with the updated dynamic name of the first controlled device. If a new topology map is generated, the updated dynamic name of the first controlled device will be utilized.

Central controller 102 may determine that communication has been lost to the first controlled device. The central controller may identify the remote, neighbor device of the first controlled device based on the dynamic name of the first controlled device. For example the central controller may parse the dynamic name of the first controlled device in order to ascertain information related to the remote, neighbor device. The central controller 102 may provide a message, for example, by displaying on a display, communicating to another device within system 100, etc., identifying the remote, neighbor device of the first controlled device as having failed.

Central controller 102 may receive a communication from a third controlled device (not shown). The third controlled device may replace the first controlled device, for example, controlled device 108. The communication may include a dynamic name of the third controlled device. Central controller may store the dynamic name of the third controlled device in memory. Central controller may update the topology map by replacing the dynamic name of the first controlled device with the dynamic name of the third controlled device.

Figure 6:
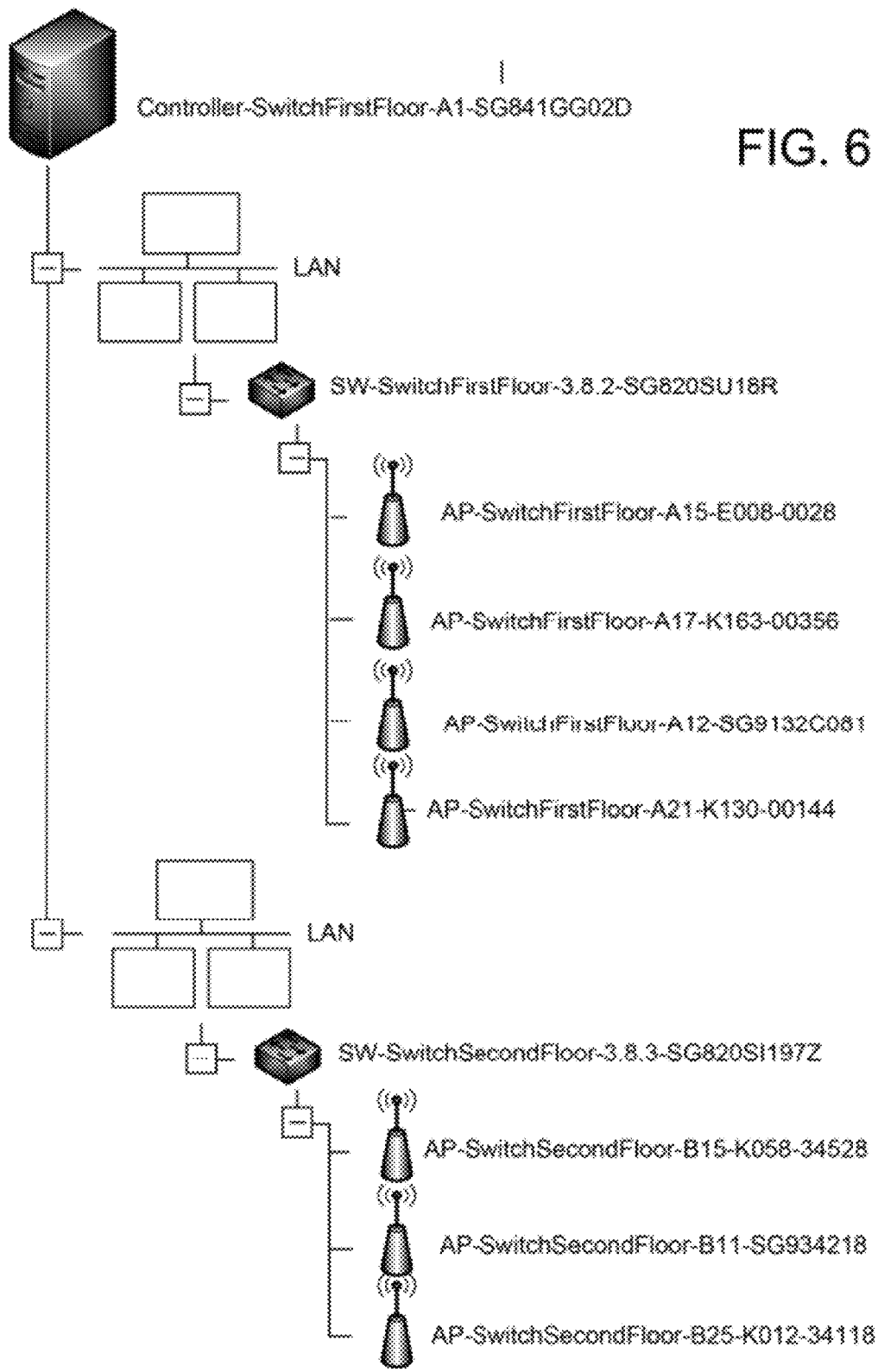
FIG. 6 is a diagram depicting an example of a topology map, according to at least one embodiment of the present disclosure.

FIG. 6 depicts a diagram depicting an example of a topology map. As can be seen in FIG. 6, the dynamic names of the devices are included in the generated topology map, thereby providing information, for example relative location, physical location, etc., relating to each of the devices within a network system. The dynamic names of the controlled devices depicted in FIG. 6 were generated with the dynamic name definition as follows: AP-<Remote Neighbor Name>-<Remote Port>-<AP Serial Number>. The dynamic name of the central controller device depicted in FIG. 6 was generated with the dynamic name definition as follows: Controller-<Remote Neighbor Name>-<Remote Port>-<Controller Serial Number>. The dynamic names of the switches depicted in FIG. 6 were generated with the dynamic name definition as follows: SW-<Switch Name>-<Software Version>-<Switch Serial Number>.

It may be appreciated that the topology map may be generated where the dynamic name of certain devices are not depicted in the topology map. For example, the central controller's dynamic name may not be depicted in the generated topology map since the location of the central controller is not likely to change and an administrator would know where the device is located. This may be configured using the topology application.

We claim:

1. A method for generating a dynamic name of a device within a network, comprising:
   accessing information related to the device;
   accessing information related to a remote, neighbor device;
   generating a dynamic name of the device based on the accessed information related to the device and the accessed information related to the remote, neighbor device, the dynamic name comprising at least a portion of the information related to the remote, neighbor device, wherein the information related to the remote, neighbor device of the device includes at least one of a name, a model, an IP address, and a port name of the remote, neighbor device of the device; and
   storing the generated dynamic name of the device;
   receiving a communication from a different remote, neighbor device;
   extracting information related to the different remote, neighbor device;
   storing the extracted information related to the different remote, neighbor device;
   generating an updated dynamic name of the device based on the accessed information related to the device and information related to the different remote, neighbor device; and
   storing the generated updated dynamic name of the device.

2. The method of claim 1, further comprising:
   transmitting the generated dynamic name to a central controller.

3. The method of claim 1, further comprising:
   receiving a communication from the remote, neighbor device, the communication including the information related to the remote, neighbor device;
   extracting the information related to the remote, neighbor device; and
   storing the extracted information.

4. The method of claim 3, wherein the received communication is transmitted utilizing a layer 2 discovery protocol.

5. The method of claim 1, wherein generating the dynamic name of the device includes:
   accessing a dynamic name definition, the dynamic name definition including a dynamic component and a static component; and
   generating the dynamic name of the device by completing the dynamic component of the dynamic name definition with information related to the remote, neighbor device and with information related to the device.

6. The method of claim 1, further comprising:
   transmitting the updated dynamic name of the device to a central controller.

7. The method of claim 1, wherein the dynamic name is a user-configurable string of characters including identifying information of the device and identifying information of the remote, neighbor device.

8. An apparatus, comprising:
   a memory, and
   a processor, to:
   extract information related to a remote, neighbor device from a communication received from the remote, neighbor device;
   store, in memory, the extracted information;
   access a dynamic name definition, the dynamic name definition including a dynamic component and a static component;
   generate a dynamic name of the apparatus by completing the dynamic component of the dynamic name definition with information related to the remote, neighbor device and with information related to the apparatus, the dynamic name comprising at least a portion of the information related to the remote, neighbor device, wherein the information related to the remote, neighbor device of the apparatus includes at least one of a name, a model, an IP address, and a port name of the remote, neighbor device of the apparatus;
   store, in memory, the generated dynamic name of the apparatus; and
   transmit the generated dynamic name of the apparatus to a controller device;
   receive a communication from a different remote, neighbor device;
   extract information related to the different remote, neighbor device;
   store the extracted information related to the different remote, neighbor device;
   generate an updated dynamic name of the apparatus based on the accessed information related to the apparatus and the accessed information related to the different remote, neighbor device; and
   transmit the generated updated dynamic name of the device to the controller device.

9. The apparatus of claim 8, the processor further to:
access the dynamic name definition, the dynamic name definition including the dynamic component and the static component; and
generate the updated dynamic name of the apparatus by completing the dynamic component of the dynamic name definition with information related to the different remote, neighbor device and with the information related to the apparatus.

10. The apparatus of claim 8, wherein the communication is transmitted utilizing a layer 2 or a layer 3 protocol.

11. The apparatus of claim 8, wherein the dynamic name is a user-configurable string of characters including identifying information of the apparatus and identifying information of the remote, neighbor device.

12. An apparatus, comprising:
a memory, and
a processor, to
access, from memory, a dynamic name of a first controlled device, the dynamic name of the first controlled device comprising at least a portion of information related to a remote, neighbor device of the first controlled device, wherein the information related to the remote, neighbor device of the first controlled device includes at least one of a name, a model, an IP address, and a port name of the remote, neighbor device of the first controlled device;
access a dynamic name of a second controlled device, the dynamic name of the second controlled device comprising at least a portion of information related to a remote, neighbor device of the second controlled device, wherein the information related to the remote, neighbor device of the second controlled device includes at least one of a name, a model, an IP address, and a port name of the remote, neighbor device of the second controlled device; and
generate a topology map of a network including the dynamic name of the first controlled device and the dynamic name of the second controlled device;
provide the generated topology map;
determine that communication has been lost to the first controlled device;
identify the remote, neighbor device of the first controlled device based on the dynamic name of the first controlled device; and
provide a message identifying the remote, neighbor device of the first controlled device as having failed.

13. The apparatus of claim 12, the processor further to:
receive a communication from the first controlled device, the communication including an updated dynamic name of the first controlled device; and
update, in memory, the dynamic name of the first controlled device with the updated dynamic name of the first controlled device.

14. The apparatus of claim 12, wherein the dynamic name of the first controlled device is a user-configurable string of characters including identifying information of the first controlled device and identifying information of the remote, neighbor device of the first controlled device.

15. The apparatus of claim 12, the processor further to:
receive a communication from a third controlled device, the third controlled device replacing the first controlled device, the communication including a dynamic name of the third controlled device;
storing the dynamic name of the third controlled device in memory; and
updating the topology map by replacing the dynamic name of the first controlled device with the dynamic name of the third controlled device.

* * * * *